(12) United States Patent
Tso et al.

(10) Patent No.: US 8,714,220 B2
(45) Date of Patent: May 6, 2014

(54) TRANSMISSION ASSEMBLY AND WHEEL THEREOF

(75) Inventors: Tse-Ying Tso, New Taipei (TW); You-Wei Teng, New Taipei (TW)

(73) Assignee: MSI Computer (Shenzhen) Co., Ltd., Shenzhen, Guangdong Province (CN)

( * ) Notice: Subject to any disclaimer, the term of this patent is extended or adjusted under 35 U.S.C. 154(b) by 423 days.

(21) Appl. No.: 13/097,166

(22) Filed: Apr. 29, 2011

(65) Prior Publication Data

US 2012/0193969 A1 Aug. 2, 2012

(30) Foreign Application Priority Data

Jan. 31, 2011 (TW) .............................. 100202301 U

(51) Int. Cl.
*B60B 5/02* (2006.01)
(52) U.S. Cl.
USPC .......................................... 152/375; 152/385
(58) Field of Classification Search
USPC .............. 152/173, 174, 175, 176, 185.1, 375, 152/378, 379.3, 379.5, 380, 384, 385, 152/DIG. 18; 305/5.306
See application file for complete search history.

(56) References Cited

U.S. PATENT DOCUMENTS

2010/0052412 A1 * 3/2010 Morris ..................... 301/64.701

FOREIGN PATENT DOCUMENTS

TW M281812 U 12/2005

* cited by examiner

*Primary Examiner* — Joseph Pape
(74) *Attorney, Agent, or Firm* — Morris Manning & Martin LLP; Tim Tingkang Xia, Esq.

(57) ABSTRACT

A transmission assembly and a wheel thereof are presented, and the wheel includes a wheel frame and a tire skin. The wheel frame has a ring-shaped joint surface surrounding the wheel frame, and the joint surface is disposed with at least one slot. The slot has two opposite side walls and at least one stopping wall, and the stopping wall is located between the two side walls. The tire skin is ring-shaped. The tire skin is sleeved on the wheel frame, and attached to the joint surface. The tire skin has at least one protruding rib, and the protruding rib is located in the slot. The stopping wall limits displacement of the protruding rib in a direction of a wheel shaft, and the two side walls limit displacement of the protruding rib in a direction of rotation, thus achieving a good combination effect between the tire skin and the wheel frame.

4 Claims, 5 Drawing Sheets

TRANSMISSION ASSEMBLY AND WHEEL THEREOF

CROSS-REFERENCE TO RELATED APPLICATIONS

This non-provisional application claims priority under 35 U.S.C. §119(a) on Patent Application No. 100202301 filed in Taiwan, R.O.C. on Jan. 31, 2011, the entire contents of which are hereby incorporated by reference.

BACKGROUND OF THE INVENTION

1. Field of the Invention

The present invention relates to a transmission assembly and a wheel thereof, and more particularly to a transmission assembly and a wheel thereof with a replaceable tire skin.

2. Related Art

Generally speaking, a robot cleaner on market uses wheels as a mobile mechanism thereof. A tire skin of the wheel of the robot cleaner is normally made of rubber. Whenever the wheel rotates, the tire skin is worn by abrasion of varying degrees at the same time. Specifically, the tire skin is consumable, so that a user needs to replace the tire skin of the wheel regularly to keep the wheel rotating normally as not to slip.

Currently, in a joining method of the tire skin and a wheel frame of the robot cleaner, fixation is achieved by mold double injection. Specifically, the wheel frame and the tire skin are integrally formed by double injection, so that the combination of the wheel frame and the tire skin is fairly stable. But for the joining method of mold double injection, the production cost is too high, and when the tire skin is worn, both the wheel frame and the tire skin have to be replaced at the same time, thus increasing the material cost.

In another conventional joining method of the tire skin and the wheel frame, fixation is achieved by press-fit. Specifically, the outer diameter of the tire skin is slightly smaller than the outer diameter of the wheel frame, and the tire skin is forced to be sleeved on the wheel, thus achieving a press-fit effect to fix the tire skin to the wheel frame. For the joining method, the production cost is low, and when the tire skin is worn, only the tire skin is required to be replaced, thus reducing the material cost. When the press-fit method is used, if the interference between the tire skin and the wheel frame is too large, although the combination of the tire skin and the wheel frame is very stable, it is more difficult for the tire skin to be mounted to the wheel frame, and the time required for replacing the tire skin of the wheel is relatively increased at the same time. In contrast, if the interference between the tire skin and the wheel frame is too small, although it is easier for the tire skin to be mounted to the wheel frame, the combination of the tire skin and the wheel frame is weak, thus causing the rotating wheel to slip easily.

Therefore, the conventional joining methods of the tire skin and the wheel frame do not have advantages of improved combination, lowered cost, and convenient assembly at the same time.

SUMMARY OF THE INVENTION

Accordingly, the present invention is a transmission assembly and a wheel thereof, so as to solve the problem in the conventional joining methods of the tire skin and the wheel frame that the improvement of combination, lowering of cost, and convenience of assembly cannot be achieved at the same time.

According to the present invention, a wheel comprises a wheel frame and a tire skin. The wheel frame has a ring-shaped joint surface surrounding the wheel frame, and the joint surface is disposed with at least one slot. The slot has two opposite side walls and at least one stopping wall, and the stopping wall is located between the two side walls. The tire skin is ring-shaped. The tire skin is sleeved on the wheel frame, and attached to the joint surface. The tire skin has at least one protruding rib. The protruding rib has two opposite sliding surfaces and two opposite limiting surfaces. The protruding rib slides into the slot through the two sliding surfaces and along the two side walls. The stopping wall presses against one of the limiting surfaces to limit displacement of the protruding rib in a direction of a wheel shaft. The two side walls press against the two sliding surfaces to limit displacement of the protruding rib in a direction of rotation.

According to the present invention, a transmission assembly comprises a transmission mechanism and a wheel. The transmission mechanism comprises a gearbox and a rotating shaft. The gearbox has a box side surface. The rotating shaft is disposed at the gearbox, and passes through the box side surface. In addition, the wheel comprises a wheel frame and a tire skin. The wheel frame is connected to the rotating shaft. The wheel frame has a ring-shaped joint surface, and a first surface and a second surface opposite to each other. The first surface faces the box side surface, and the joint surface is located between the first surface and the second surface. The joint surface is disposed with at least one slot. The slot has a stopping wall and an opening opposite to each other and two opposite side walls. The stopping wall and the opening are located between the two side walls, and the opening penetrates through the first surface. The tire skin is ring-shaped. The tire skin is sleeved on the wheel frame, and attached to the joint surface. The tire skin has at least one protruding rib. The protruding rib has two opposite sliding surfaces and two opposite limiting surfaces. The protruding rib slides into the slot through the two sliding surfaces and along the two side walls. The stopping wall and the box side surface respectively press against the two limiting surfaces to limit displacement of the protruding rib in a direction of a wheel shaft. The two side walls press against the two sliding surfaces to limit displacement of the protruding rib in a direction of rotation.

In view of the above, in a transmission assembly and a wheel thereof according to the present invention, a tire skin can be sleeved on a wheel frame easily, and through a slot of the wheel frame corresponding to a protruding rib of the tire skin, the tire skin can be fixed to the wheel frame stably rather than sliding easily. In addition, by co-working of a stopping wall of the wheel frame and a box side surface, the protruding rib of the tire skin is sandwiched between the stopping wall and the box side surface, thus preventing the tire skin from falling from one side of the wheel frame. Therefore, the replaceable tire skin not only can be mounted to the wheel frame conveniently, but also achieves good assembly combination and the effect of lowering the material cost.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention.

Wherever possible, the same reference numbers are used throughout the drawings to refer to the same or like elements of an embodiment, and wherein.

DETAILED DESCRIPTION OF THE INVENTION

Figure 1A:
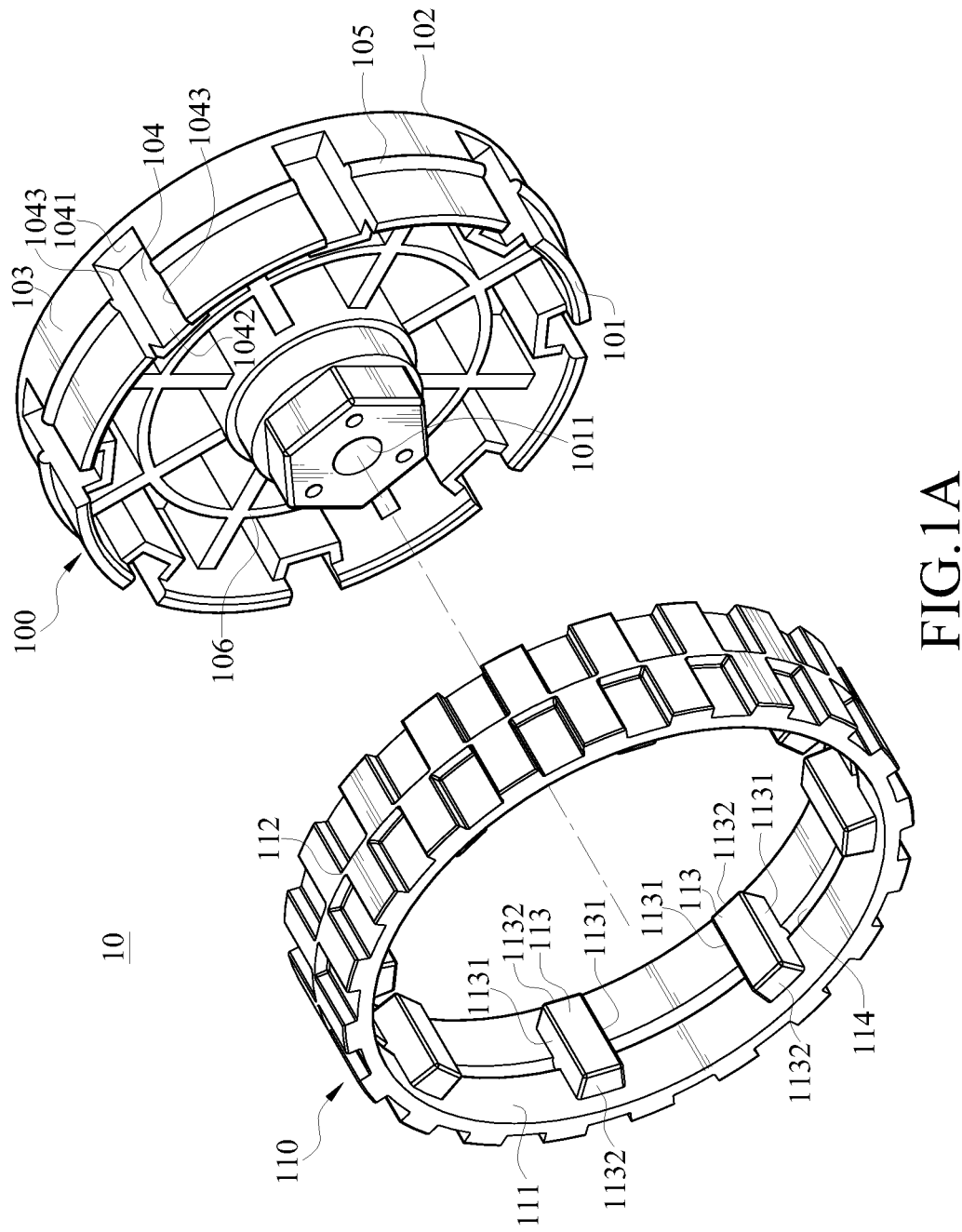
FIG. 1A is a schematic structural view of a wheel according to an embodiment of the present invention.
Figure 1B:
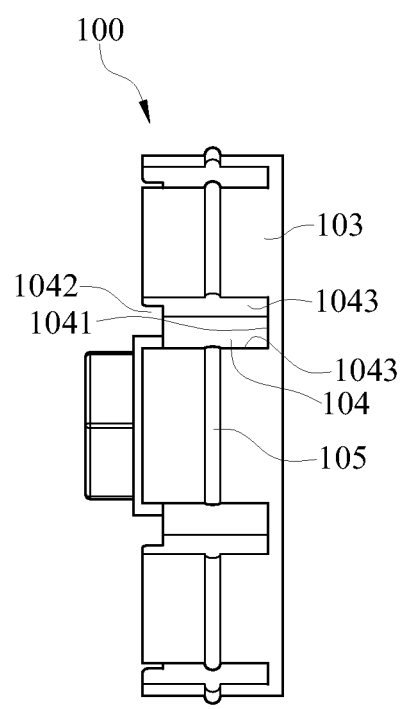
FIG. 1B is a structural side view of a wheel frame according to an embodiment of the present invention.

Referring to FIG. 1A and FIG. 1B, FIG. 1A is a schematic structural view of a wheel according to an embodiment of the present invention, and FIG. 1B is a structural side view of a wheel frame according to an embodiment of the present invention.

According to an embodiment of the present invention, a wheel 10 comprises a wheel frame 100 and a tire skin 110. The wheel frame 100 is disk-shaped, and has a ring-shaped joint surface 103, and a first surface 101 and a second surface 102 opposite to each other. The joint surface 103 surrounds the wheel frame 100, and is located between the first surface 101 and the second surface 102. In other words, the joint surface 103 is sandwiched between the first surface 101 and the second surface 102. The first surface 101 has a shaft hole 1011 for insertion of a rotating shaft. Specifically, the wheel frame 100 can rotate with the rotating shaft inserted into the shaft hole 1011 as an axle center. In addition, the first surface 101 further has multiple radial and concentric circular reinforcing ribs 106. The reinforcing ribs 106 are used for improving the rigidity of the wheel frame 100.

In this embodiment, the joint surface 103 of the wheel frame 100 is disposed with multiple slots 104. The slots 104 are disposed away from each other at intervals. The slot 104 further has a stopping wall 1041 and an opening 1042 opposite to each other, and two opposite side walls 1043. The opening 1042 is opened on the first surface 101. In other words, one side of the slots 104 penetrates through the first surface 101. In addition, a direction from the stopping wall 1041 to the opening 1042 is the same as that of the rotating shaft of the wheel frame 100, and both the stopping wall 1041 and the opening 1042 are located between the two side walls 1043, as shown in FIG. 1B.

In this embodiment, the tire skin 110 is ring-shaped, and has an outer surface 112 and an inner surface 111 opposite to each other. The inner surface 111 has multiple protruding ribs 113. The shape and number of the protruding ribs 113 correspond to the shape and number of the slots 104 of the wheel frame 100. The tire skin 110 is sleeved on the wheel frame 100, and is attached to and wraps the joint surface 103. The protruding rib 113 has two opposite sliding surfaces 1131 and two opposite limiting surfaces 1132. The protruding rib 113 slides into the slot 104 through the two sliding surfaces 1131 and along the two side walls 1043. The stopping wall 1041 presses against one of the limiting surfaces 1132 to limit displacement of the protruding rib 113 in a direction of a wheel shaft. The two side walls 1043 press against the two sliding surfaces 1131 to limit displacement of the protruding rib 113 in a direction of rotation.

In other words, the tire skin 110 is mounted along a direction from the first surface 101 of the wheel frame 100 to the second surface 102 of the wheel frame 100, so that the protruding rib 113 slides into the slot 104 through the opening 1042. In this case, the stopping wall 1041 presses against the protruding rib 113 to limit the displacement of the protruding rib 113 in the direction of the wheel shaft, thus achieving an effect of fixing the tire skin 110 to the wheel frame 100. When the tire skin 110 is sleeved on the wheel frame 100, the inner surface 111 of the tire skin 110 is attached to the joint surface 103 of the wheel frame 100, and the protruding rib 113 is locked in the slot 104. The displacement of the protruding rib 113 in the direction of rotation is limited by sandwiching the protruding rib 113 between the two side walls 1043, so that when the wheel 10 rotates, the tire skin 110 does not rotate relative to the wheel frame 100 to cause the wheel 10 to slip.

In addition, the wheel frame 100 has a positioning rib 105, and the positioning rib 105 is disposed surrounding the joint surface 103. The tire skin 110 has a positioning slot 114 corresponding to the positioning rib 105. When the tire skin 110 is mounted to the wheel frame 100, the positioning rib 105 is engaged in the positioning slot 114. The arrangement of the positioning rib 105 and the positioning slot 114 is to limit axial displacement of the tire skin 110 relative to the wheel frame 100, thus preventing the tire skin 110 from getting loose to fall from the wheel frame 100 easily.

Since in this embodiment, the tire skin 110 and the wheel frame 100 are combined by matching of the protruding rib 113 and the slot 104, the tire skin 110 can be easily replaced and mounted, thus solving the problem of difficult assembly caused by the conventional combination manner of press-fit.

It should be noted that, the number of the protruding ribs 113 and the number of the slots 104 in this embodiment are not intended to limit the present invention, and persons skilled in the art may adjust the number of the protruding ribs 113 and the number of the slots 104 appropriately according to actual needs. In addition, the width of the slot 104 in this embodiment is not intended to limit the present invention, and persons skilled in the art may adjust the width of the slot 104 appropriately according to actual needs.

Figure 2A:
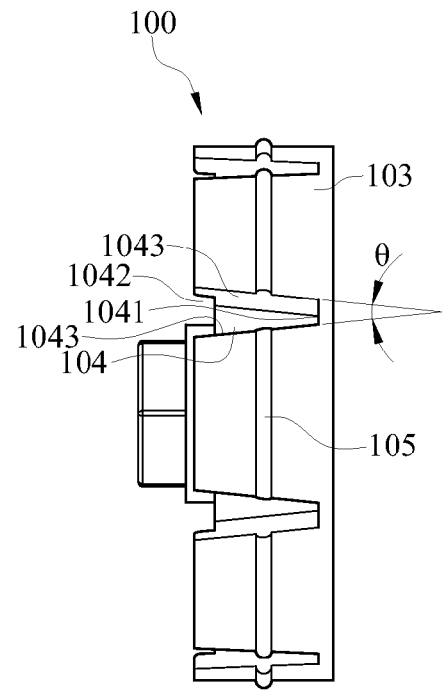
FIG. 2A is a structural side view of a wheel frame according to another embodiment of the present invention.
Figure 2B:
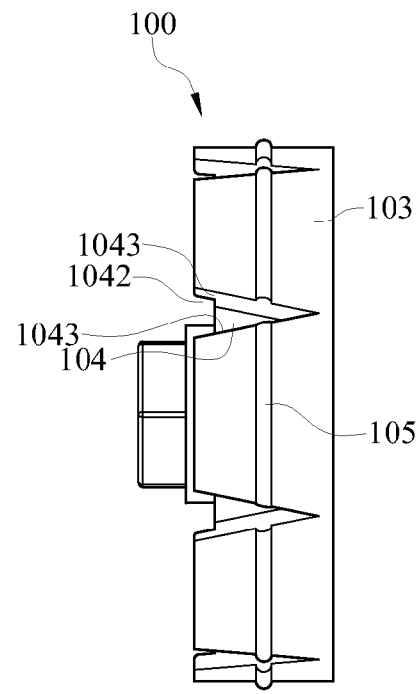
FIG. 2B is a structural side view of a wheel frame according to another embodiment of the present invention.

Additionally, in the embodiment as shown in FIG. 1B, the two side walls 1043 are disposed parallel to each other, so that the slot 104 is rectangular, but this characteristic is not intended to limit the present invention. For example, in another embodiment of the present invention, the two side walls 1043 may form an angle θ. In addition, viewed in a direction from the first surface 101 to the second surface 102, the distance between the two side walls 1043 is gradually narrowed, so that the slot 104 is trapezoidal, as shown in FIG. 2A. Alternatively, in another embodiment of the present invention, the two side walls 1043 may contact each other directly, so that the slot 104 is triangular, as shown in FIG. 2B. With the angle between the two side walls 1043, when the tire skin 110 is sleeved on the wheel frame 100, the side walls 1043 produce a guiding effect, so that the protruding rib 113 can be guided into the slot 104 more easily, thus increasing the assembly efficiency.

Figure 3A:
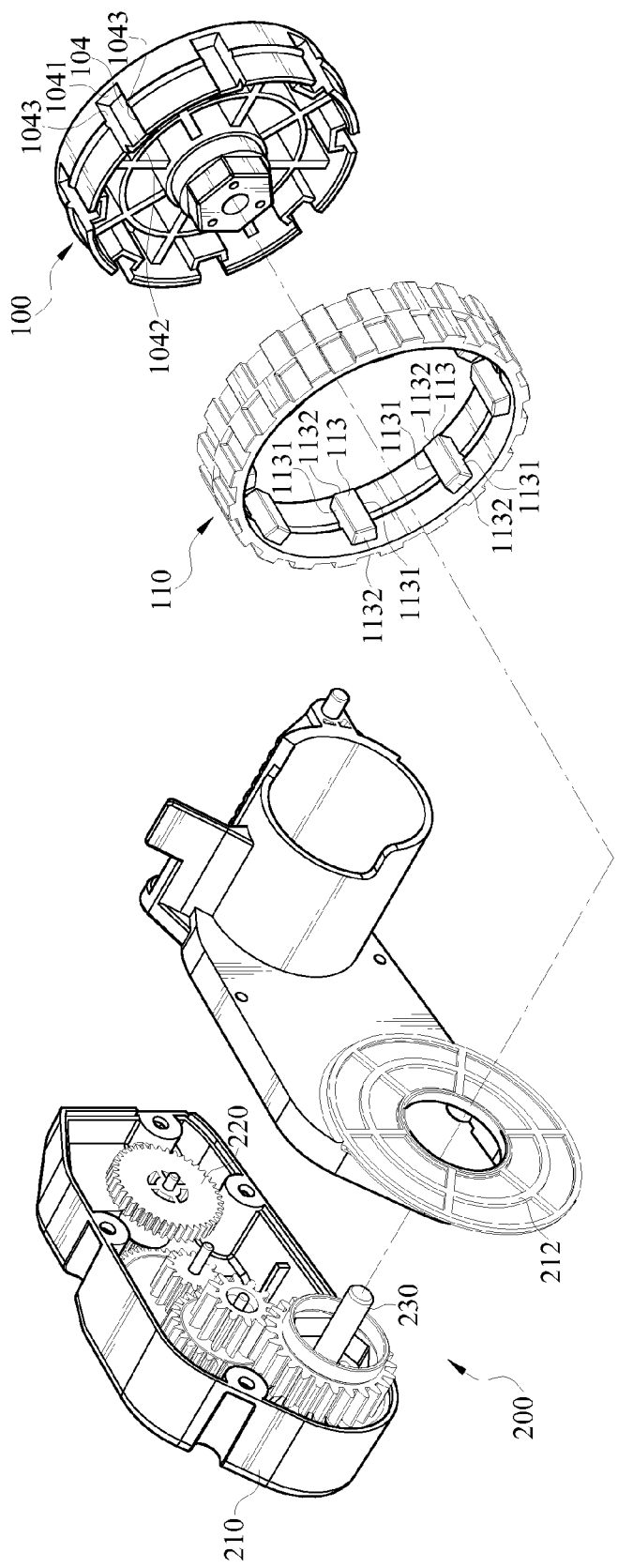
FIG. 3A is a schematic structural view of a transmission assembly according to an embodiment of the present invention.
Figure 3B:
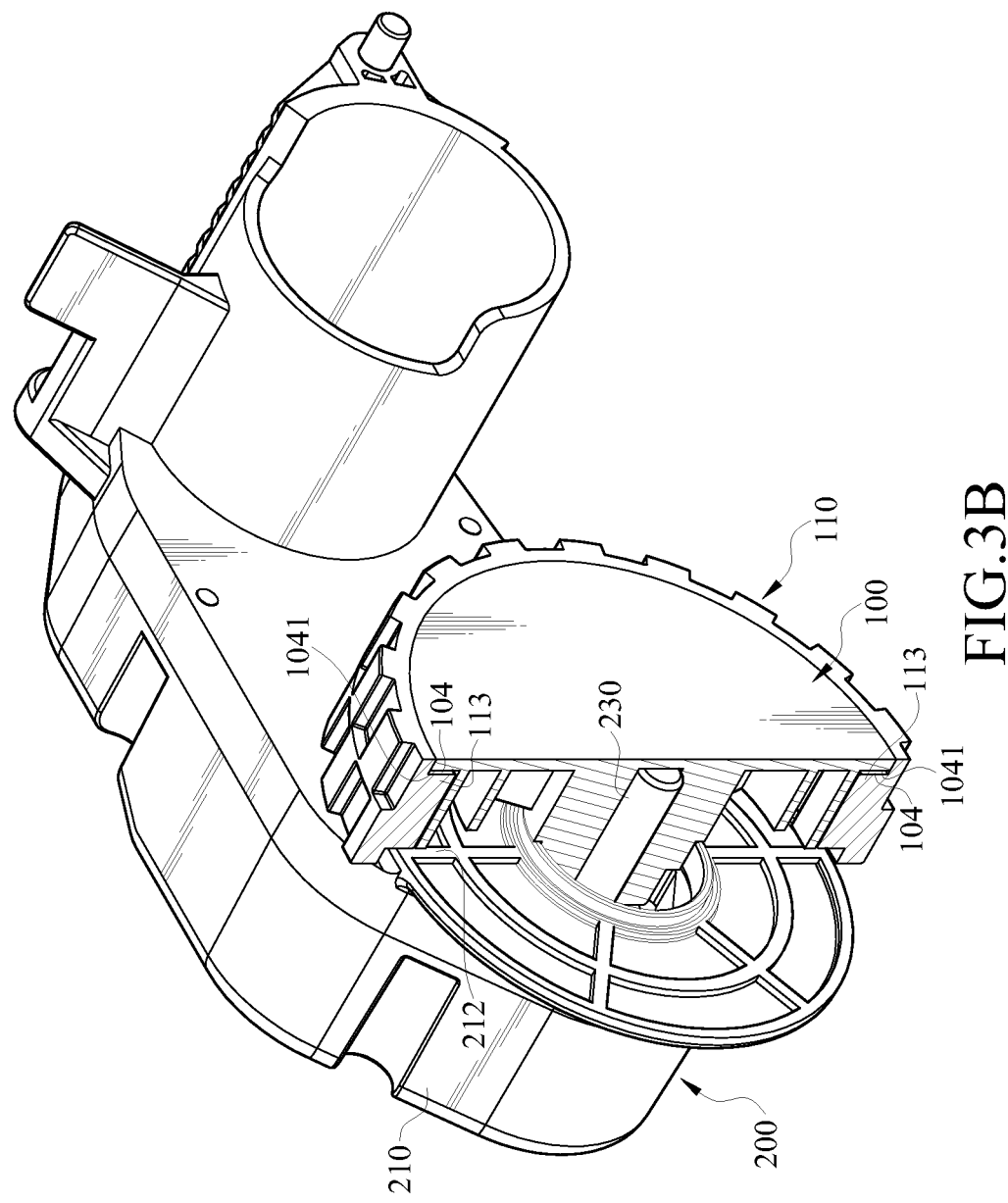
FIG. 3B is a structural sectional view of a transmission assembly according to an embodiment of the present invention.

Referring to FIG. 3A and FIG. 3B, FIG. 3A is a schematic structural view of a transmission assembly according to an embodiment of the present invention, and FIG. 3B is a structural sectional view of a transmission assembly according to an embodiment of the present invention.

In this embodiment, a transmission assembly comprises a transmission mechanism 200 and a wheel 10. The transmission mechanism 200 comprises a gearbox 210 and a rotating shaft 230. The gearbox 210 has a gear set 220 inside, and the gearbox 210 has a box side surface 212. The rotating shaft 230 is disposed at the gearbox 210, and connected to the gear set 220. The rotating shaft 230 passes through the box side surface 212. The transmission assembly can drive the gear set 220 to propel the rotating shaft 230 to rotate by being connected to an external driver, such as a motor.

The wheel 10 comprises a wheel frame 100 and a tire skin 110. The wheel frame 100 is disk-shaped, and has a ring-shaped joint surface 103, and a first surface 101 and a second surface 102 opposite to each other. The first surface 101 faces the box side surface 212. The joint surface 103 surrounds the wheel frame 100, and is located between the first surface 101 and the second surface 102. In other words, the joint surface 103 is sandwiched between the first surface 101 and the second surface 102. The first surface 101 has a shaft hole 1011 for insertion of the rotating shaft 230. Specifically, the rotating shaft 230 can drive the wheel frame 100 to rotate. In addition, the first surface 101 further has multiple radial and concentric circular reinforcing ribs 106. The reinforcing ribs 106 are used for improving the rigidity of the wheel frame 100.

In this embodiment, the joint surface 103 of the wheel frame 100 is disposed with multiple slots 104. The slots 104 are disposed away from each other at intervals. The slot 104 further has a stopping wall 1041 and an opening 1042 opposite to each other, and two opposite side walls 1043. The opening 1042 is opened on the first surface 101. In other words, one side of the slots 104 penetrates through the first surface 101. In addition, a direction from the stopping wall 1041 to the opening 1042 is the same as that of the rotating shaft of the wheel frame 100, and both the stopping wall 1041 and the opening 1042 are located between the two side walls 1043.

In this embodiment, the tire skin 110 is ring-shaped, and has an outer surface 112 and an inner surface 111 opposite to each other. The inner surface 111 has multiple protruding ribs 113. The shape and number of the protruding ribs 113 correspond to the shape and number of the slots 104 of the wheel frame 100. The tire skin 110 may be sleeved on the wheel frame 100 to wrap the joint surface 103 of the wheel frame 100. The protruding rib 113 has two opposite sliding surfaces 1131 and two opposite limiting surfaces 1132. The protruding rib 113 slides into the slot 104 through the two sliding surfaces 1131 and along the two side walls 1043. The stopping wall 1041 and the box side surface 212 press against the two limiting surfaces 1132 to limit displacement of the protruding rib 113 in a direction of a wheel shaft. The two side walls 1043 press against the two sliding surfaces 1131 to limit displacement of the protruding rib 113 in a direction of rotation.

In other words, the tire skin 110 is mounted along a direction from the first surface 101 of the wheel frame 100 to the second surface 102 of the wheel frame 100, so that the protruding rib 113 slides into the slot 104 through the opening 1042. When the tire skin 110 is sleeved on the wheel frame 100, the inner surface 111 of the tire skin 110 is attached to the joint surface 103 of the wheel frame 100, and the protruding rib 113 is locked in the slot 104. The displacement of the protruding rib 113 in the direction of rotation is limited by sandwiching the protruding rib 113 between the two side walls 1043, so that when the wheel 10 rotates, the tire skin 110 does not rotate relative to the wheel frame 100 to cause the wheel 10 to slip.

In addition, the protruding rib 113 is also sandwiched between the stopping wall 1041 and the box side surface 212 at the same time, as shown in FIG. 3B. Specifically, the stopping wall 1041 and the box side surface 212 limit axial displacement of the protruding ribs 113. Thus, the tire skin 110 can definitely be prevented from getting loose to fall from a direction of the first surface 101 or from a direction of the second surface 102 of the wheel frame 100 when the wheel 10 rotates.

According to the transmission assembly and the wheel thereof in the above embodiment, the tire skin can be replaced relative to the wheel frame, thus solving the problem of excessively high material cost caused by the combination manner of double injection of the prior art. In addition, since the tire skin and the wheel frame are not combined by press-fit, the tire skin can be mounted and dismounted relative to the wheel frame easily, thus saving working hours for assembly. Additionally, through the slot of the wheel frame corresponding to the protruding rib of the tire skin, the tire skin can be limited between the two side walls of the wheel frame stably rather than sliding easily, so as to avoid the slipping of the wheel. Furthermore, by co-working of the stopping wall of the wheel frame and the box side surface, the protruding rib of the tire skin is limited between the stopping wall and the box side surface, thus preventing the tire skin from falling from the axial side of the wheel frame. Therefore, the replaceable tire skin not only can be mounted to the wheel frame conveniently, but also achieves good assembly combination and the effect of lowering the material cost.

What is claimed is:

1. A wheel, comprising:
    a wheel frame, having a ring-shaped joint surface surrounding the wheel frame, wherein the joint surface is disposed with at least one slot and a positioning rib, the slot has two opposite side walls and at least one stopping wall, and the stopping wall is located between the two side walls; and
    a tire skin, being ring-shaped, wherein the tire skin is sleeved on the wheel frame and attached to the joint surface, the tire skin has at least one protruding rib and a positioning slot corresponding to the positioning rib, the protruding rib has two opposite sliding surfaces and two opposite limiting surfaces, the protruding rib slides into the slot through the two sliding surfaces and along the two side walls, the stopping wall presses against one of the limiting surfaces to limit displacement of the protruding rib in a direction of a wheel shaft, and the two side walls press against the two sliding surfaces to limit displacement of the protruding rib in a direction of rotation.

2. The wheel according to claim 1, wherein the wheel frame has a first surface and a second surface opposite to each other, the joint surface is located between the first surface and the second surface, the slot further has an opening, the opening penetrates through the first surface, the opening is opposite to the stopping wall, and the protruding rib enters the slot through the opening.

3. The wheel according to claim 2, wherein the two side walls form an angle.

4. The wheel according to claim 2, wherein the first surface of the wheel frame is disposed with multiple reinforcing ribs.

* * * * *